April 29, 1924.

M. Y. TUCKER

KITCHEN UTENSIL

Filed April 5, 1923

1,491,936

WITNESSES

INVENTOR
Martin Y. Tucker

Patented Apr. 29, 1924.

1,491,936

UNITED STATES PATENT OFFICE.

MARTIN Y. TUCKER, OF WICHITA FALLS, TEXAS.

KITCHEN UTENSIL.

Application filed April 5, 1923. Serial No. 630,072.

*To all whom it may concern:*

Be it known that I, MARTIN Y. TUCKER, a citizen of the United States, residing at Wichita Falls, in the county of Wichita and State of Texas, have invented a new and useful Kitchen Utensil, of which the following is a specification.

The invention relates to a kitchen utensil to be used for the purpose of handling pots, kettles, pans and the like.

Another object of the invention is to provide a stove lid lifter in combination with the other advantages herein set forth.

A further object of the invention is to provide a device of this nature that can be used for handling all manner of cooking receptacles without the usual danger of burning the hands.

Another object of the invention is to provide a device of this nature that is very simple and practical and can be manufactured and sold at a very nominal cost.

The nature and advantages of the invention will be better understood when the following detail description is read in connection with the accompanying drawing forming a part of this application. The invention residing in the construction, combination and arrangement of parts as claimed.

Figure 1:
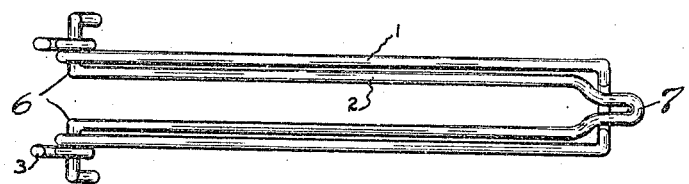
Figure 2:
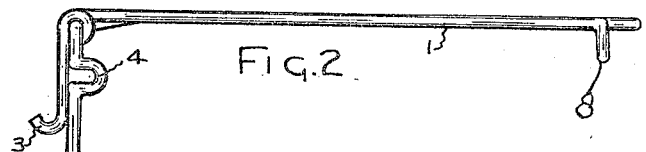
Figure 4:
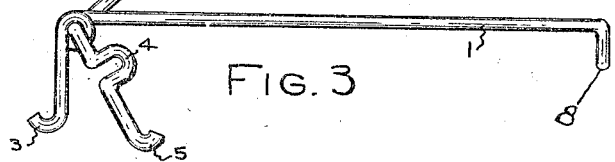
Figure 3:
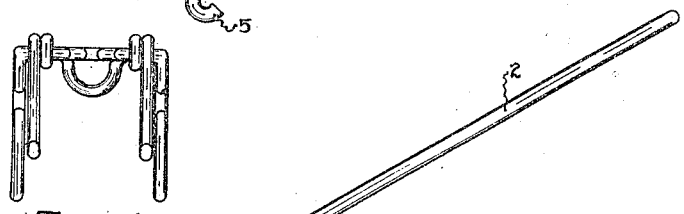

In the accompanying drawing the various parts will be referred to by numbers, and, wherein, Figure 1 is a top view.
Figure 2 is a side view.
Figure 3 is a side view opened.
Figure 4 is an end view.

The device forming the subject matter of this invention comprises an arrangement of round metal, heavy wire or drill rod may be used. The entire device is constructed of two pieces, 1 being the exterior part of the handle, which is arranged as shown. 2 is the interior part of the handle, which is arranged parallel, when closed, with the exterior part 1. The interior rod 2 is provided with right angle offset portions as shown at 6. The exterior rod 1 is wound one full turn around the offset portion of the interior rod 2 and bent downward at right angles thereto. A hook is arranged on the end thereof, as shown at 3. The ends of the interior rod 2 are bent downward from the end of the aforementioned offset portion, and are bent in a substantially U-shaped manner, as shown at 4, for the purpose hereinafter described, then extended downward, having a hook arranged on the end thereof, as shown at 5.

The end of the interior handle 2 opposite the right angle offset portions is formed into a small substantially U-shaped member as shown at 7 providing a lifter for stove lids. The end of the exterior handle 1, opposite the ends engaging the right angle offset portions of the handle 2, is depressed as shown at 8 to receive the said small U-shaped member 7.

The invention is operated in the following manner: The interior handle 2 is raised to the position as shown in Figure 3 and the U-shaped offsets 4 placed over the exterior bead of a receptacle, the handle 2 is then closed, securely clamping the receptacle, and providing a handle for the same. Covers of receptacles, etc., may be handled with the hooks as shown at 3 and 5.

It will be noted that a complete description of the various uses where this instrument may be employed would be impossible. The device may be used for all manner of purposes in connection with cooking.

While it is believed from the foregoing description the nature and advantages of the invention will be readily apparent, I desire to have it understood that I do not limit myself to what is herein shown and described, and that such changes may be resorted to, when desired, as fall within the scope of what is herein claimed.

What I claim is:

1. A kitchen utensil of the character described comprising a pair of handles pivotally connected having downward disposed clamping members from said pivot connections, one of said clamping members having a U-shaped depressed portion intermediate its ends, one of said handles having a substantially U-shaped member on one end thereof opposite the pivotally connected end, one of said handles having a depressed portion on one end thereof opposite the pivotally connected end in association with the last mentioned U-shaped member.

2. A pair of handles normally disposed in exterior and interior relation, said interior handle having oppositely disposed right angle offsets on one end thereof thence terminating in downward disposed clamping members having depressed portions intermediate the ends, the opposite end of said interior handle formed into a U-shaped member and projecting beyond said exterior handle, said exterior handle being depressed in association with said U-shaped member, the opposite ends thereof being pivotally connected to said right angle offsets of said interior handle, thence extending downward therefrom terminating in clamping members in association with the clamping members of said interior handle.

MARTIN Y. TUCKER.

Witnesses:
C. B. Toney, Jr.,
Fred. L. Bronson.